Figure 1:
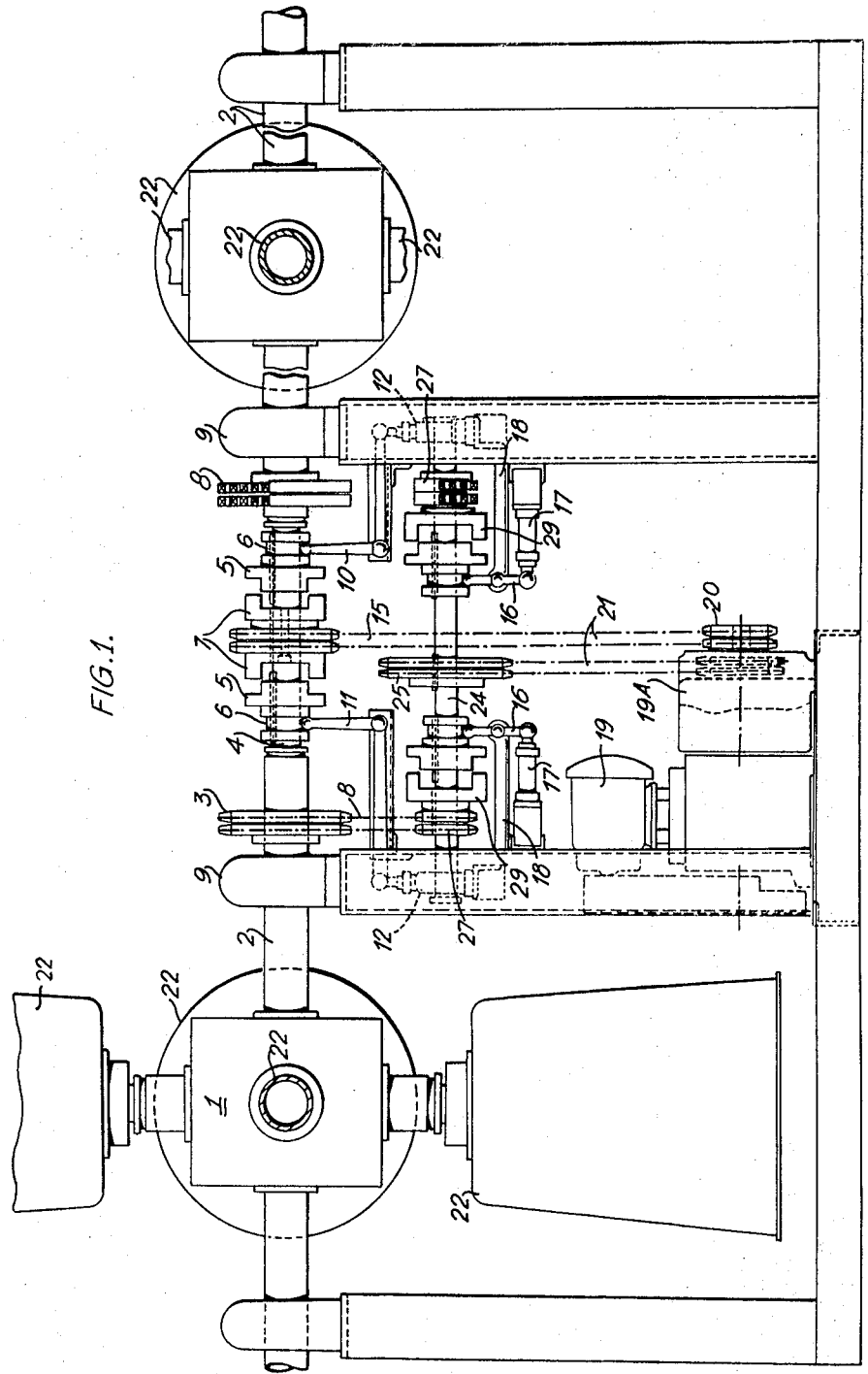

United States Patent

[11] 3,574,245

| [72] | Inventor | Rolf Gordon Dohm |
| | | London, England |
| [21] | Appl. No. | 763,284 |
| [22] | Filed | Sept. 27, 1968 |
| [45] | Patented | Apr. 13, 1971 |
| [73] | Assignee | Dohm Plastics Machinery Limited |
| | | London, England |
| [32] | Priority | Oct. 4, 1967 |
| [33] | | Great Britain |
| [31] | | 45,234/67 |

[54] ROTATIONAL CASTING OF PLASTICS MATERIAL
10 Claims, 5 Drawing Figs.

[52] U.S. Cl. .................................................. 18/26
[51] Int. Cl. .................................................. B29c 5/04
[50] Field of Search ........................................ 18/53 (H), 5.5, 26 (M), 26 (R); 65/258, 259, 600; 107/19, 27, 28, 29; 164/297; 264/311

[56] References Cited
UNITED STATES PATENTS
3,095,260   6/1963   Ferriot .......................... 18/26
3,388,429   6/1968   Barnett et al. .................. 18/26

FOREIGN PATENTS
767,547   9/1967   Canada ........................ 18/26

Primary Examiner—J. Spencer Overholser
Assistant Examiner—Lucius R. Frye
Attorney—Baldwin, Wight & Brown ABSTRACT: A rotational casting machine is provided in which the moulds are rotatable on two perpendicular axes and are heated or cooled by passing liquid through jackets around the moulds, the moulds being mounted on tubular housings rotatable in a bevel box which is itself rotated on a tubular shaft; the shaft, housing and box providing a first path for liquid to or from the moulds. A second path is provided by pipes concentric with the shaft and the housings. The moulds are preferably detachable, the fluid path therethrough being completed on mounting them on their housings. For additional rigidity, the housings may all be journaled in a bearing block central of the bevel box, the bearing block also forming a distribution block for the pipes defining the second path for liquid.

ROTATIONAL CASTING OF PLASTICS MATERIAL

This invention relates to apparatus for the rotational casting of plastics materials.

Rotational casting is a technique for producing articles from plastics materials in which a quantity of particulate or fluent plastics material is placed in a closed mould, and the mould is then subjected to heat whilst being rotated on (usually) two separate axes. The effect of the rotation is to distribute the material over the inner walls of the mould, and the heating, in the case of thermosetting materials causes the material to gel, or in the case of thermoplastic materials causes it to fuse. In the case of thermoplastic materials at least, the mould is then cooled whilst rotation is continued, and in either case the finished article is removed from the mould.

Normally, the rotating moulds are heated by placing them in ovens and cooled by the application of cold air or water, but it has been proposed to use jacketed moulds through which a liquid heat transfer medium at an appropriate temperature is passed. This arrangement has a number of advantages, in particular, the elimination of the need for ovens, and the greater control over temperature that is possible.

However, the admission and exhaust of the heat transfer liquid from moulds which are mounted for rotation on two separate axes presents considerable difficulties, and arrangements previously proposed have necessitated the use of a number of rotating unions subject to external leakage, together with a quantity of external pipe work. An example of such an arrangement is shown in our copending British Pat. application No. 34636/65. Quite apart from the desirability of reducing the number of such unions and external pipe work as much as possible, their provision introduces a serious restriction on the number of moulds which can be provided in the same machine, and also considerably complicates the exchange of moulds when it is desired to use the machine for moulding a different article.

The object of the present invention is to provide an improved arrangement for supplying and exhausting heat transfer fluid from jacketed moulds in a rotational casting machine which is of simplified construction and reduces the possibility of external leakage.

A further object is to simplify the exchanging of moulds.

According to the invention, a rotational casting machine comprises a shaft supporting one or more radially extending jacketed moulds adapted to rotate about said first shaft and about second axes substantially perpendicular to that of said shaft, said moulds being driven for rotation about said second axes by bevel gearing housed in a bevel box integral with said first shaft, said first shaft defining a first pipe to said bevel box or boxes forming a first passage for heat transfer fluid to or from the jackets of said moulds, and a second pipe located coaxially within said first pipe with radial branches within said bevel box or boxes to said mould or moulds whereby to provide a second path for heat transfer fluid from or to the jackets of said moulds.

Figure 2:
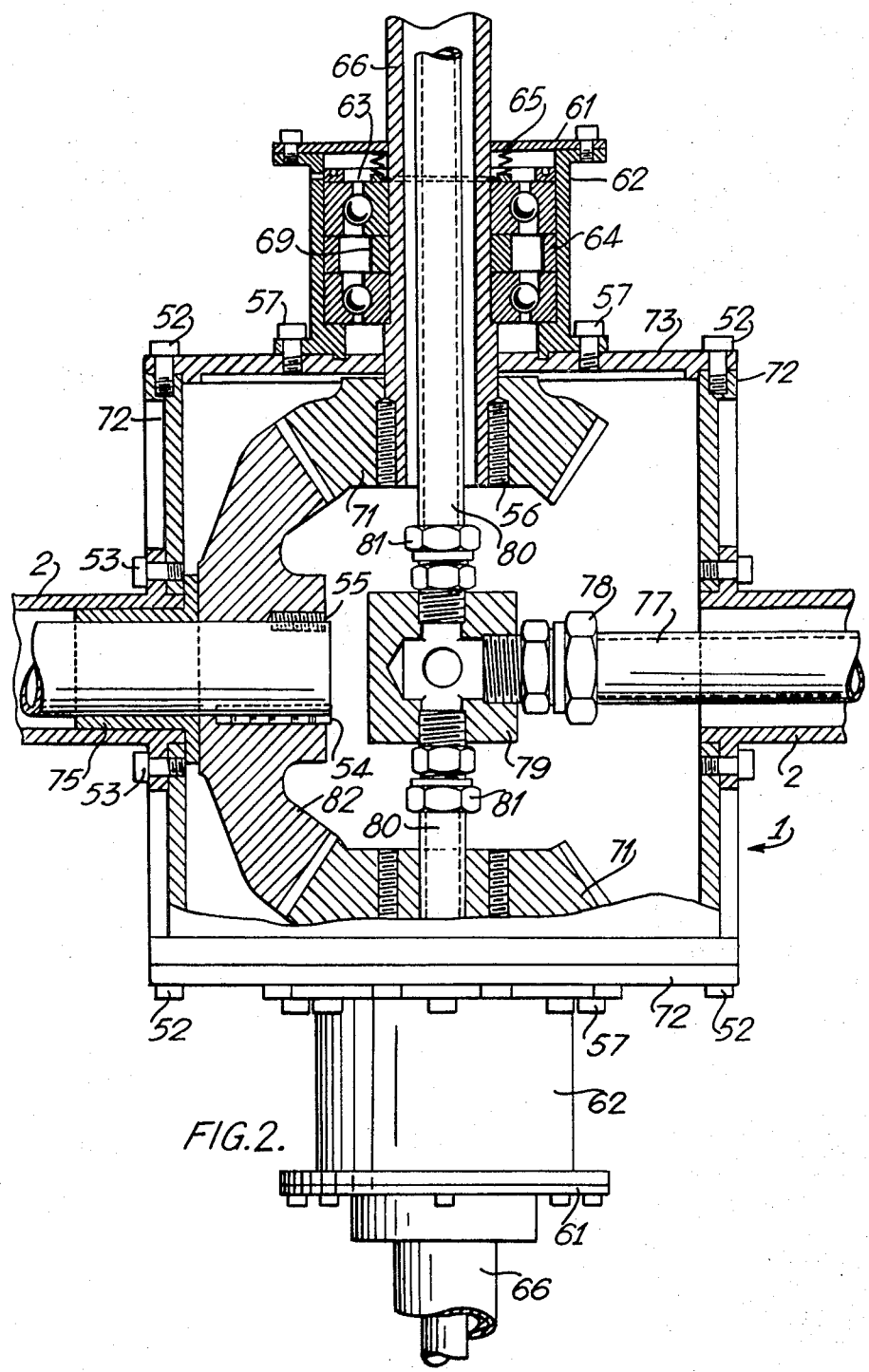
Figure 3:
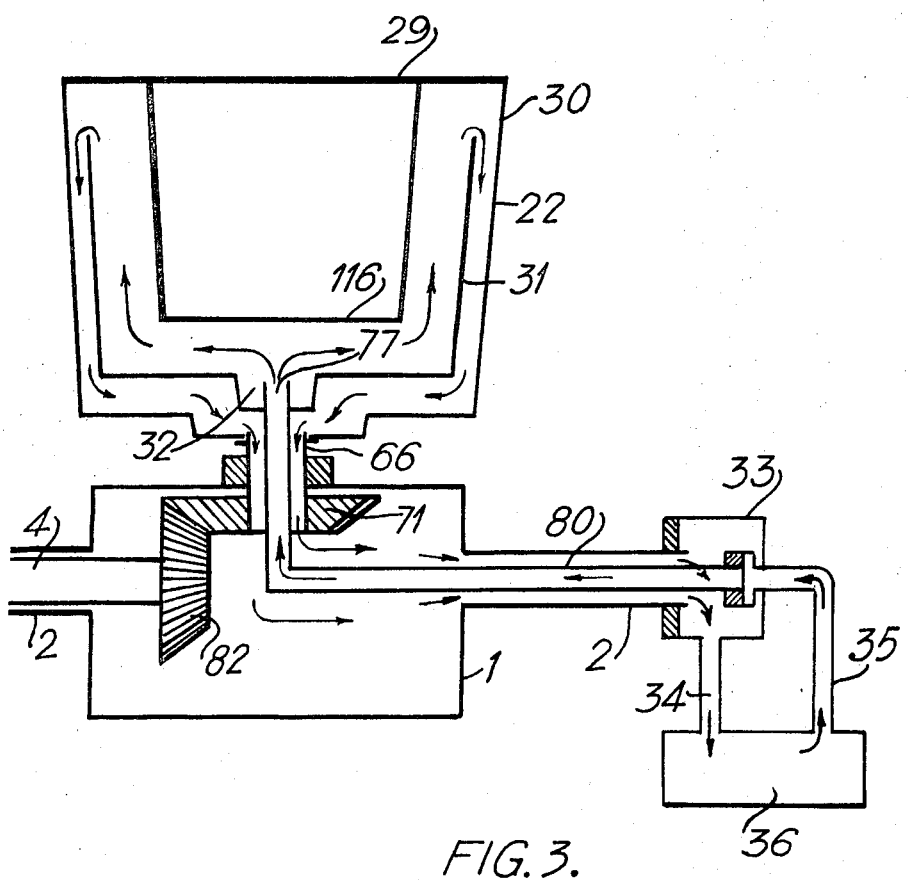
Figure 4:
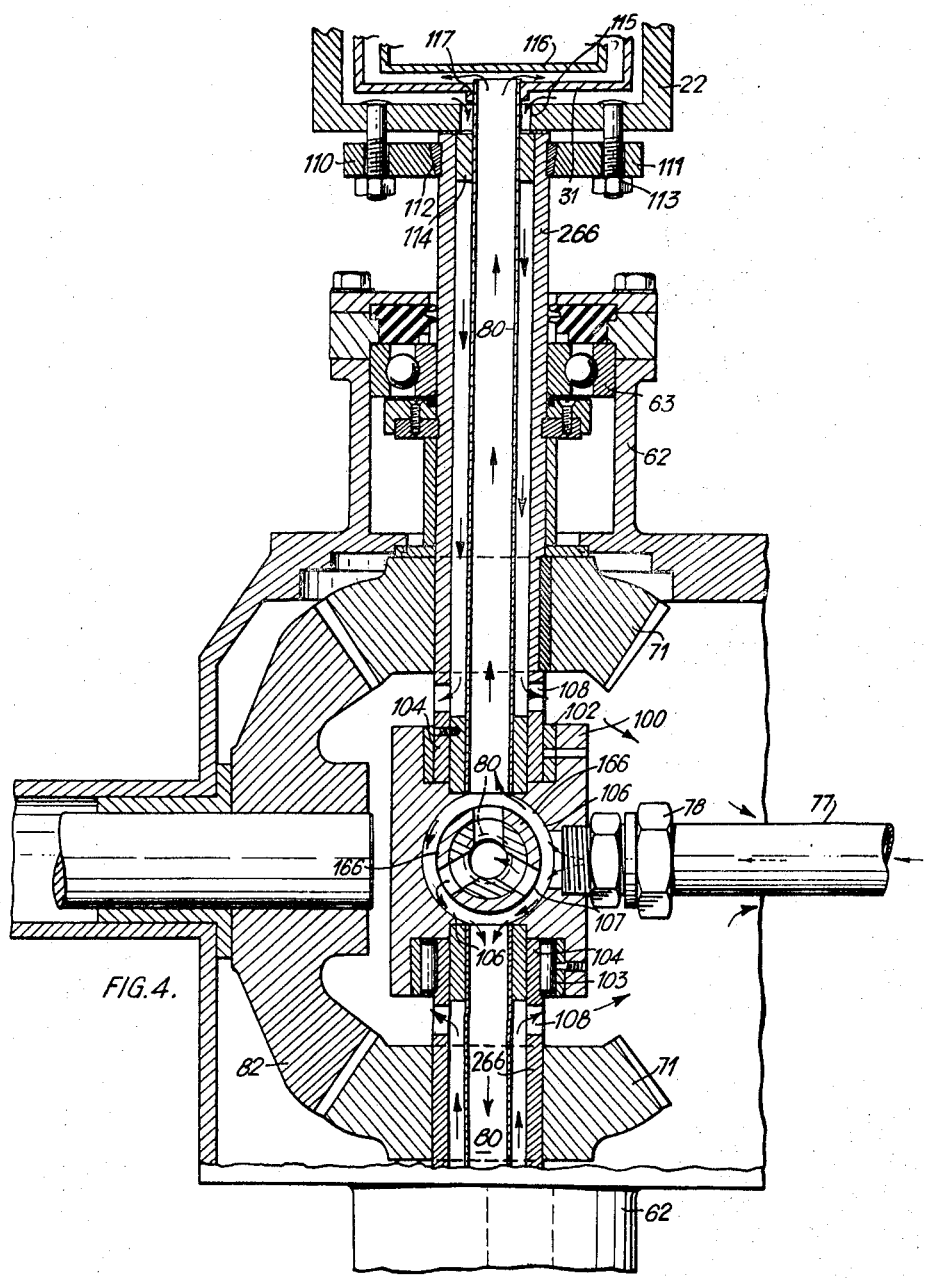
Figure 5:
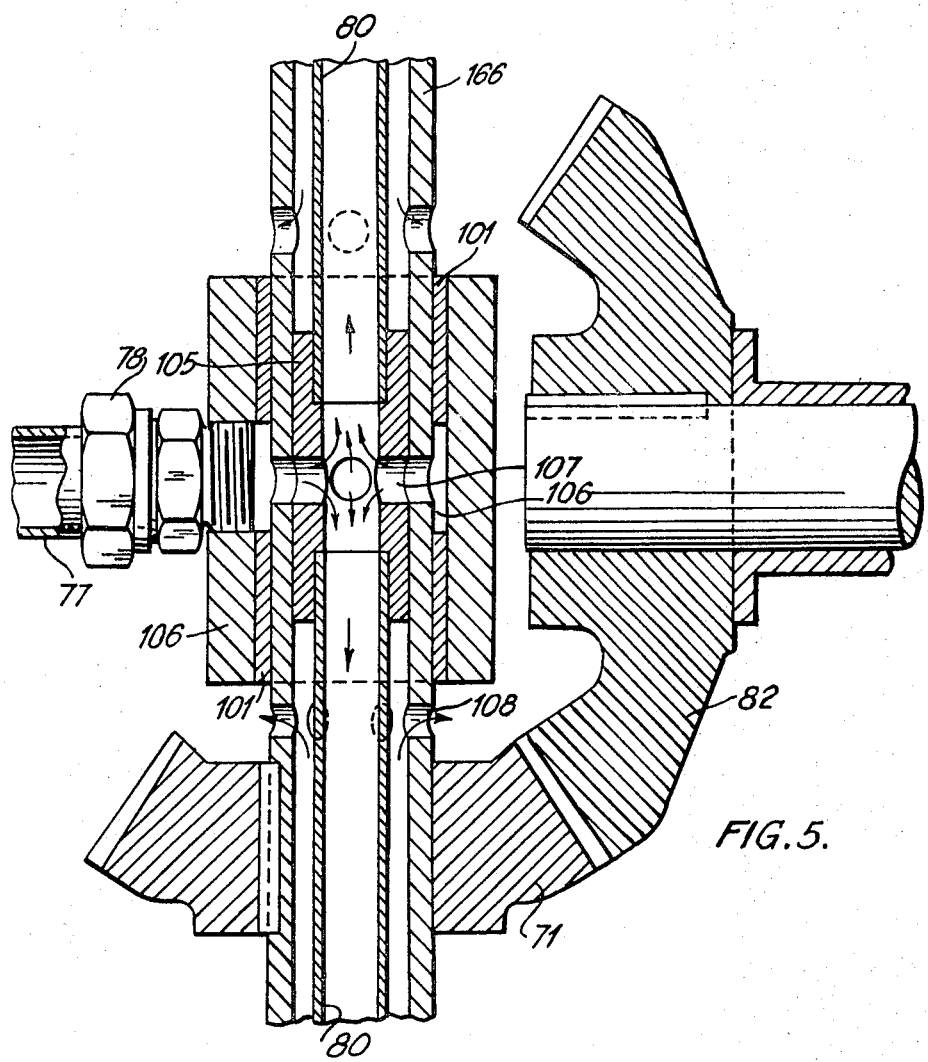

Preferred embodiments of the invention are described with reference to the accompanying drawings, in which:

FIG. 1 shows a rotational casting machine in elevation;
FIG. 2 shows one bevel box in part section;
FIG. 3 is a diagrammatic section of the apparatus, showing the path of the heat transfer fluid therethrough;
FIG. 4 shows a fragmentary section through the bevel box of an alternative embodiment; and
FIG. 5 is a fragmentary section on the line V—V in FIG. 4.

Referring first to FIG. 1, the machine shown comprises two sets of four moulds 22 mounted on bevel box 1 in turn carried by shafts 2 journaled in bearings 9. The shafts 2 are hollow, and their inner sections contain coaxial shafts 4 on which the sliding members 6 of a pair of dog clutches are located by keys 5. The sliding members 6 may be moved into engagement with a common dogged member 7 by means of pneumatic actuators 12 acting through linkages 10, 11. Member 7 is driven by a chain 15 from a sprocket 20 carried by a geared-down motor 19.

The shafts 2 are driven by chains 8 and sprockets 3 and 27 from a layshaft 24 through dog clutches 29, these latter clutches being operated by pneumatic actuators 17 via levers 16 and pivots 18. The layshaft 24 is driven through a sprocket 25 by a chain 21 from a further sprocket 20 on a further geared-down motor 19A.

Referring to FIG. 2, which shows one bevel box 1 in section, the moulds 22 (see FIG. 1) extend radially in a ring relative to the shaft 2, the moulds being supported by tubular housings 66 whose axes perpendicularly intersect the axis of the shaft 2.

The shaft 2 is integral with the bevel box 1 which is built up from end plates 72 and side plates 73 secured together by bolts 52, two sections of the shaft being secured in opposed apertures in the end plates by bolts 53. The housings 66 are journaled in opposed pairs of thrust bearings 63 separated by spacers 64, 69, and housed in castings 62 secured by bolts 57 to the side plates 73. The outer ends of the castings 62 are closed by annular housings 61 accommodating fluid seals 65 engaging the outer thrust bearings 63.

Journaled coaxially within one section of the primary shaft 2 by a bearing 75 is the coaxial shaft 4, to the inner end of which is attached a bevel pinion 82 by means of a key 54 and a screw 55, whilst a further, meshing bevel pinion 71 is secured to the inner end of each housing 66 by screws 56.

Coaxially within the other section of the primary shaft 2 is a pipe 77 connected by a union 78 to a distribution block 79 situated centrally within the bevel box. Further pipes 80 connected to the distribution block by unions 81 extend coaxially through the housing 66 to the moulds.

By rotating the primary and secondary shafts at different speeds, the moulds will be rotated about their own axis and that of the primary shaft, whilst one passage for heat transfer medium into or out of the moulds is provided by one section of the primary shaft 2, the bevel box an the housings 66, and another passage by the pipes 77 and 80 and the distribution block 79, thus permitting a through flow to and from the moulds.

By adopting this construction, the need for external rotating unions associated with the moulds is eliminated. A junction between the pipes 80 and the mould jackets will be required at which there will be relative movement, but this will be enclosed by the liquid passage defined by the mould itself. This is illustrated in FIG. 3, which shows the path of fluid through the bevel box and a mould 22 releasably secured to the housing 66. It will be seen that the mould 22 is defined by a hollow jacket 30 and a lid 29, though the mould may of course be differently constructed. What is important is that the jacketed portions of the moulds be supplied with a baffle 31 as shown or an equivalent arrangement defining a circulatory path for fluid from the pipe 80 to the housing 66. A rotary union 32 is provided between the baffle 31 and the pipe 80, but leakage here is not a problem since the seal is fully enclosed within the jacket 30. The union may be formed by a socket within which the pipe 80 is a sliding fit. The path of the fluid through the bevel box and mould is shown by the arrows, though the direction of this path could be reversed if desired. Fluid leaves and enters the bevel box via one part of the shaft 2 and via the pipe 77 respectively. These communicate with pipes 34, 35, leading to and from a heat exchanger unit 36 via a rotary union 33.

Referring now to FIGS. 4 and 5, these FIGS. show the bevel box of an alternative embodiment more suitable for use with large and heavy moulds. Where possible, similar reference numerals will be used for similar parts as in FIG. 2.

It will be noted in FIG. 2 that the entire weight of each mould 22 is carried by the relatively closely spaced thrust bearings 63 in one of the castings 62. In the embodiment of FIGS. 4 and 5 this difficulty is overcome by mounting two opposed moulds 22 on a common tubular housing 166 extending right through the bevel box, and supported at widely spaced points by thrust bearings 63 in the castings 62, the housing 166 being related by a single bevel pinion 71 driven from a bevel drive pinion 82. Third and fourth moulds are each supported by tubular housings 266 journaled in a bearing block 100 mounted for rotation on the housing 166 by means of bushes 101. The housings 266 may be journaled in the block 100 either by means of a plain bush 102 as shown in the upper half of FIG. 4, or a roller bearing 103 as shown in the lower half of that FIG. This arrangement ensures that the weight of each mould is supported at two widely spaced points and further that the housings 166 and 266 give each other mutual support. The bearing block 100 also acts as a distribution block for the heat exchange liquid. An annular chamber 106 defined by the block 100, the housing 166 and the bushes 101 is placed in communication with a pipe 77, which enters the chamber concentric with the shaft 2 (see FIGS. 1 and 2), by means of a union 78. This chamber communicates with pipes 80, these pipes being mounted coaxial with the housings 266 by means of inboard bushes 104 and outboard bushes 114. Pipes 80 are also mounted within the housing 166, but their inboard ends are mounted by means of a bush 105, the interior of which is in communication with the chamber 106 through ports 107 passing through the bush 105 and the housing 166. The housings 166 and 266 communicate with the interior of the bevel box through ports 108, and longitudinal ports (not shown) are formed in the bushes 114.

The moulds 22 are detachably mounted on the outer ends of the housings 166, 266 by means of clamp assemblies comprising clamping member 110, 111 acting on a conical sleeve 112 surrounding the end of the housing concerned, the clamping members being actuated by bolt 113 extending through the outer shell of the mould 122. Within the outer shell is an inner shell 116 forming with the outer shell the mould jacket, whilst between the shells is a baffle 31 constraining the heat exchange fluid to follow a circulatory path within the jacket. The outer ends of the pipes 80 pass through an orifice 115 in the outer shells and are a push fit in sockets 117 in the baffles 31 of each mould, and hence a circulatory path for liquid through the mould jacket is completed merely by clamping a mould in place, the exchange liquid following the path shown by the arrows in the drawings.

I claim:

1. A rotational casting machine comprising a shaft, at least one radially extending jacketed mould, means mounting each mould for rotation about said shaft and about a second axis substantially perpendicular to that of said shaft, means for driving each mould for rotation about the respective second axis, said means for driving including bevel gearing housed in a bevel box integral with said shaft being in the form of first pipe means to said bevel box forming a first passage for heat transfer fluid to one or from the jacket of each mould, and second pipe means located coaxially within said first pipe with a radially extending branch pipe extending from within said bevel box to the respective mould providing a second path for heat transfer fluid from or to the jacket of each mould.

2. A rotational casting machine as claimed in claim, 1, wherein the shaft is hollow and extends to both sides of the bevel box, the shaft on one side of said bevel box housing said second pipe means, and the shaft on the other side of said bevel box housing a second shaft driving said bevel gearing.

3. A rotational casting machine as claimed in claim 1, wherein each mould is carried by a hollow housing journaled in said bevel box, and in sealing relation thereto, and each mould jacket is provided with an internal baffle defining a circulatory path for fluid therein extending between the hollow housing and union with the respective branch pipe which extend from the bevel box through said housing.

4. A rotational casting machine as claimed in claim 3, wherein an oppositely located pair of said moulds are carried by a common housing journaled in and extending through said bevel box.

5. A rotational casting machine as claimed in claim 4, wherein a bearing block is journaled on said common housing within said bevel box and defines an annular chamber surrounding a radially ported portion of said housing, the second pipe means is in communication with said annular chamber, the branch pipes associated with the moulds associated with said common housing are in communication with the radially ported portion of said housing, and the chambers formed between said housing and said branch pipes are in communication with the interior of the bevel box.

6. A rotational casting machine according to claim 5, wherein further moulds are provided, the inner ends of their associated tubular housings are journaled in said bearing block, the associated branch pipes are in communication with said annular chamber, and the chambers formed between said housings and said branch pipes are in communication with the interior of the bevel box.

7. A rotational casting machine according to claim 6, wherein the moulds are releasably clamped to the hollow housings, and each branch pipe is a push fit in a socket in a means for distributing fluid within the jacket of the associated mould.

8. A rotational casting machine according to claim 3, wherein the moulds are releasably clamped to the hollow housings, and each branch pipe is a push fit in a socket in a means for distributing fluid within the jacket of the associated mould.

9. A rotational casting machine according to claim 4, wherein the moulds are releasably clamped to the hollow housings, and each branch pipe is a push fit in a socket in a means for distributing fluid within the jacket of the associated mould.

10. A rotational casting machine according to claim 5 wherein the moulds are releasably clamped to the hollow housings, and each branch pipe is a push fit in a socket in a means for distributing fluid within the jacket of the associated mould.